(12) United States Patent
Wang et al.

(10) Patent No.: US 11,787,051 B2
(45) Date of Patent: Oct. 17, 2023

(54) METHOD FOR AUTOMATICALLY PROCESSING STRUCTURE-REINFORCING MEMBER OF AIRCRAFT

(71) Applicant: Nanjing University of Aeronautics and Astronautics, Nanjing (CN)

(72) Inventors: Jun Wang, Nanjing (CN); Anyi Huang, Nanjing (CN); Cheng Yi, Nanjing (CN); Zeyong Wei, Nanjing (CN); Hao Yan, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/058,845

(22) Filed: Nov. 25, 2022

(65) Prior Publication Data
US 2023/0106347 A1    Apr. 6, 2023

(30) Foreign Application Priority Data
Nov. 25, 2021    (CN) .......................... 202111414000.2

(51) Int. Cl.
*B25J 9/16*        (2006.01)
*B25J 11/00*      (2006.01)

(52) U.S. Cl.
CPC ........... *B25J 9/1664* (2013.01); *B25J 9/1694* (2013.01); *B25J 11/0055* (2013.01)

(58) Field of Classification Search
CPC .... B25J 9/1664; B25J 9/1694; B25J 11/0055; B25J 9/1679; B25J 9/1628; B25J 9/163;
(Continued)

(56) References Cited

U.S. PATENT DOCUMENTS 10,065,318 B2 *    9/2018    Bain ...................... B25J 9/1684
2019/0011529 A1    1/2019    Choi et al.
(Continued)

FOREIGN PATENT DOCUMENTS

CN    106370106 A    2/2017
CN    109345523 A    2/2019
(Continued)

OTHER PUBLICATIONS

Wen-long Li, He Xie, Gang Zhang, Si-jie Yan, and Zhou-ping Yin, "3-D Shape Matching of a Blade Surface in Robotic Grinding Applications" IEEE/ASME Transactions on Mechatronics, vol. 21, No. 5, Oct. 2016, pp. 2294-2306 (Year: 2016).*

(Continued)

*Primary Examiner* — Bhavesh V Amin
*Assistant Examiner* — Esvinder Singh

(57) ABSTRACT

A method for automatically processing a structure-reinforcing member of an aircraft, including: (S1) acquiring, by a handheld laser scanner, data of an area to be reinforced of the aircraft; (S2) controlling a robotic arm to automatically grab the reinforcing member for automatic scanning; (S3) setting a cutting path in a computer aided design (CAD) digital model followed by registration with real data to obtain an actual cutting path, and cutting the reinforcing member; (S4) controlling the robotic arm to guide a cut reinforcing member to a scanning area for automatic scanning; and (S5) subjecting point cloud data of the cut reinforcing member and the area to be reinforced to virtual assembly and calculating a machining allowance to determine whether an accuracy requirement is met; if yes, ending a task; otherwise, grinding the reinforcing member automatically, and repeating steps (S4)-(S5).

7 Claims, 5 Drawing Sheets

(58) Field of Classification Search
CPC ...... B25J 9/1653; B25J 9/1661; B25J 9/1674; B25J 9/1684; B25J 11/005; B25J 19/021; B25J 19/022; B25J 19/023; B23P 15/00; B24B 1/00; G05B 2219/36289; G05B 2219/35168; G05B 2219/49034; G05B 2219/35075; G05B 2219/35217; G05B 2219/36248; G05B 2219/36251; G05B 2219/36438; G05B 2219/37063; G05B 2219/49387; G05B 2219/50182

See application file for complete search history.

(56) References Cited

U.S. PATENT DOCUMENTS

| | | | | |
|---|---|---|---|---|
| 2019/0258225 | A1* | 8/2019 | Link | G05B 19/4097 |
| 2020/0043186 | A1* | 2/2020 | Selviah | G06T 7/33 |
| 2021/0347501 | A1 | 11/2021 | Wang et al. | |

FOREIGN PATENT DOCUMENTS

| | | | | |
|---|---|---|---|---|
| CN | 110990975 A | 4/2020 | | |
| CN | 111275747 A | 6/2020 | | |
| CN | 111553078 A | 8/2020 | | |
| CN | 111583318 A | 8/2020 | | |
| CN | 111860520 A | 10/2020 | | |
| CN | 112376045 A | 2/2021 | | |
| CN | 112710233 A | 4/2021 | | |
| CN | 112764548 A | 5/2021 | | |
| CN | 113643270 A | 11/2021 | | |
| CN | 110443836 B | * 3/2022 | | G06F 17/16 |
| EP | 3702187 A1 | 9/2020 | | |

OTHER PUBLICATIONS

Juyong Zhang, Yuxin Yao, and Bailin Deng "Fast and Robust Iterative Closest Point" IEEE Transactions on Pattern Analysis and Machine Intelligence, vol. 44, No. 7, Jul. 2022, pp. 3450-3466 (Year: 2021).*

Jiaolong Yang et al., Method for Extracting Repair Amount of Skin Seam Based on Scan Line Point Cloud, Aeronautical Manufacturing Technology, vol. 62, Issue 10, 2019, pp. 73-77.

Yunquan Chen et al., Three-Dimensional Automatic Detection Method for Large-Scale Structure of Aircraft Based on Robot, Aeronautical Manufacturing Technology, vol. 62, Issue 10, 2019, pp. 51-57.

* cited by examiner

METHOD FOR AUTOMATICALLY PROCESSING STRUCTURE-REINFORCING MEMBER OF AIRCRAFT

CROSS-REFERENCE TO RELATED APPLICATIONS

This application claims the benefit of priority from Chinese Patent Application No. 202111414000.2, filed on Nov. 25, 2021. The content of the aforementioned application, including any intervening amendments thereto, is incorporated herein by reference in its entirety.

TECHNICAL FIELD

This application relates to aviation manufacturing, in particular to a method for automatically processing a structure-reinforcing member of an aircraft.

BACKGROUND

Long-term flight operations of a large passenger aircraft and a fighter aircraft will inevitably cause aging, cracking and deformation of load-bearing components in a structural area. During the maintenance process of the structural area, reinforcing members will be used to reinforce the strength of an area to be reinforced. However, due to the randomness and diversity in the aircraft load-bearing structural area, there are various general reinforcing members available at the maintenance site, so as to achieve the precise assembly between the reinforcing member and the area to be reinforced to strengthen the structural strength. At present, the aircraft reinforcing members are mostly processed by manual operation, which has poor processing efficiency and accuracy.

SUMMARY

This application provides a method for automatically processing a structure-reinforcing member of an aircraft, including: cutting along a cutting line marked on a computer aided design (CAD) digital model of the reinforcing member; and subjecting point clouds of the reinforcing member and an area to be reinforced to virtual assembly to generate an allowance point cloud and planning a grinding path to reach the automatic processing of the reinforcing member. This application provides a feasible solution for automatically repairing and processing the reinforcing member.

The technical solutions of the present disclosure are described as follows.

This application provides a method for automatically processing a structure-reinforcing member of an aircraft, comprising:

(S1) acquiring, by a handheld laser scanner, data of an area to be reinforced of the aircraft;

(S2) controlling a robotic arm to automatically grab the structure-reinforcing member for automatic scanning to obtain point cloud data of an outer surface of the structure-reinforcing member;

(S3) setting a theoretical cutting path in a computer aided design (CAD) digital model of the structure-reinforcing member;

subjecting the theoretical cutting path to registration with the point cloud data of the outer surface of the structure-reinforcing member to obtain an actual cutting path; and cutting the structure-reinforcing member according to the actual cutting path;

(S4) controlling the robotic arm to guide a cut structure-reinforcing member to a scanning area for automatic scanning to obtain point cloud data of an outer surface of the cut structure-reinforcing member; and (S5) subjecting the point cloud data of the outer surface of the cut structure-reinforcing member and the data of the area to be reinforced to virtual assembly and calculating a machining allowance to determine whether an accuracy requirement is met;

if yes, ending a processing task;

otherwise, grinding the cut structure-reinforcing member automatically, and repeating steps (S4)-(S5) until the accuracy requirement is met.

In an embodiment, the step (S1) is performed through steps of:

(S101) acquiring, by the handheld laser scanner, point cloud data of an inner surface of the area to be reinforced of the aircraft; and (S102) subjecting the point cloud data of the inner surface of the area to be reinforced to preprocessing and clipping to match a shape of a point cloud of the area to be reinforced with a shape of the structure-reinforcing member.

In an embodiment, in step (S102), the preprocessing comprises:

performing down-sampling and denoising processing on the point cloud data of the inner surface of the area to be reinforced.

In an embodiment, the step (S2) is performed through steps of:

(S201) selecting the structure-reinforcing member according to size, shape and damage characteristic of the area to be reinforced;

(S202) determining a reference surface of the structure-reinforcing member according to a relative position relationship between the structure-reinforcing member and the area to be reinforced; and automatically gripping, by the robotic arm, the reference surface of the structure-reinforcing member;

(S203) controlling the robotic arm to move the structure-reinforcing member to a center of a scanning area of a three-dimensional (3D) laser scanner for automatic scanning of the outer surface of the structure-reinforcing member according to a preset general scanning trajectory to obtain scanning data, and subjecting the scanning data to automatic splicing according to a target arranged on the robotic arm to obtain the point cloud data of the outer surface of the structure-reinforcing member, wherein the target is provided with a plurality of marking points.

In an embodiment, in step (S202), the 3D laser scanner is fixed at a preset position; the robotic arm is fixed near the 3D laser scanner; the target is arranged behind a gripper of the robotic arm; and is configured for automatic splicing of multi-view data of the structure-reinforcing member; and during the automatic splicing, a relative position between the target and the gripper of the robotic arm remains unchanged.

In an embodiment, the step (S3) is performed through steps of:

(S301) finding the CAD digital model corresponding to the structure-reinforcing member from a CAD digital model library;

(S302) marking the theoretical cutting path in the CAD digital model;

(S303) performing iterative closest point (ICP) registration on the CAD digital model according to the point cloud data of the outer surface of the structure-reinforcing member to obtain the actual cutting path; and unifying coordinates of the CAD digital model and the actual cutting path to a coordinate system; and (S304) controlling the robotic arm to grip the structure-reinforcing member to move to a cutting area; and performing automatic cutting according to the coordinates of the actual cutting path.

In an embodiment, the step (S4) is performed through steps of:

moving the cut structure-reinforcing member to a center of a scanning area of a 3D laser scanner for automatic scanning of the outer surface of the cut structure-reinforcing member according to a preset general scanning trajectory to obtain scanning data; and subjecting the scanning data to automatic splicing according to a target arranged on the robotic arm to obtain the point cloud data on the outer surface of the cut structure-reinforcing member; wherein the target is provided with a plurality of marking points.

In an embodiment, the step (S5) is performed through steps of:

(S501) subjecting the cut structure-reinforcing member and the area to be reinforced to plane segmentation by using a random sample consensus (RANSAC) algorithm to obtain all core planes of point cloud of the cut structure-reinforcing member and point cloud of the area to be reinforced; and calculating a normal vector, area and gravity center of each of the core planes;

(S502) roughly registering the core planes of structure-reinforcing member to the core planes of the area to be reinforced according to a corresponding relationship of normal vectors, areas and gravity centers;

(S503) based on the rough registration, performing virtual assembly by using an ICP registration based on an allowance uniformity constraint through steps of:

supposing that the point cloud data of the cut structure-reinforcing member is $P=\{p_1, p_2, \ldots, p_N\}$; the point cloud data of the area to be reinforced is $Q=\{q_1, q_2, \ldots, q_M\}$; $q_i'$ is a nearest neighbor point of point $P_i$ within Q; and $d_i = p_i - q_i'$, wherein a minimization distance constraint of the ICP registration is expressed as:

$$F_d = \sum_{i=1}^{N} \|d_i\|_2^2; \quad (1)$$

the allowance uniformity constraint of the ICP registration is expressed as:

$$F_{du} = \sum_{i=1}^{N} \left( \|d_i\|_2 - \sum_{i=1}^{N} \|d_i\|_2 / N \right)^2; \quad (2)$$

and a final optimization constraint is expressed as:

$$\min_{R,t} F = F_d + \partial \cdot F_{dt}; \quad (3)$$

wherein $\partial$ represents an adjustable weight; N represents the total number of point clouds of the cut structure-reinforcing member; and M represents the total number of point clouds of the area to be reinforced;

(S504) performing allowance point searching on the point clouds on the inner surface of the area to be reinforced and the point clouds on the outer surface of the cut structure-reinforcing member after the virtual assembly;

wherein a searching strategy is performed as follows:

calculating an average distance $Dst_i$ of k nearest neighbor points of each point of the cut structure-reinforcing member in the area to be reinforced, expressed as follows:

$$Dst_i = \sum_{j=1}^{k} \|p_i - q_j'\|_2 / k; \quad (4)$$

wherein k represents a parameter that is adjustable according to data point cloud density, with a default value of 20; if the average distance is greater than a preset threshold T, a corresponding point of the cut structure-reinforcing member is retained; otherwise, the corresponding point of the cut structure-reinforcing member is deleted; and traversing all points of the cut structure-reinforcing member, wherein retained points are allowance points of the cut structure-reinforcing member;

searching k nearest neighbor points of the allowance points of the cut structure-reinforcing member in the area to be reinforced; and retaining all searched points in the area to be reinforced and deleting points that are not in a neighborhood of the allowance points to obtain machining reference points of the allowance points; and merging the machining reference points and the allowance points to obtain final allowance points;

(S505) determining whether the machining allowance meets the accuracy requirement;

if yes, ending the processing task;

otherwise, proceeding to step (S506);

(S506) planning a grinding path according to the final allowance points; and controlling the robotic arm to grip the cut structure-reinforcing member for automatic grinding; and (S507) returning to step (S4) for automatic scanning.

Compared to the prior art, the present disclosure has the following beneficial effects.

This application provides a method for automatically processing a structure-reinforcing member of an aircraft, which is performed through acquiring three-dimensional point cloud data of the structure-reinforcing member and the area to be reinforced, cutting along a cutting line marked on a computer aided design (CAD) digital model of the structure-reinforcing member, and subjecting point clouds of the structure-reinforcing member and an area to be reinforced to virtual assembly to generate an allowance point cloud and planning a grinding path to reach the automatic processing of the structure-reinforcing member. This application can effectively solve the problems of low efficiency and poor accuracy in the manual repair of the structure-reinforcing member, and process the structure-reinforcing member automatically, so as to greatly improve the repair efficiency and automation of the aircraft load-bearing components.

DETAILED DESCRIPTION OF EMBODIMENTS

The technical solutions of the present disclosure will be described completely and clearly below with reference to the accompanying drawings and embodiments.

Figure 1:
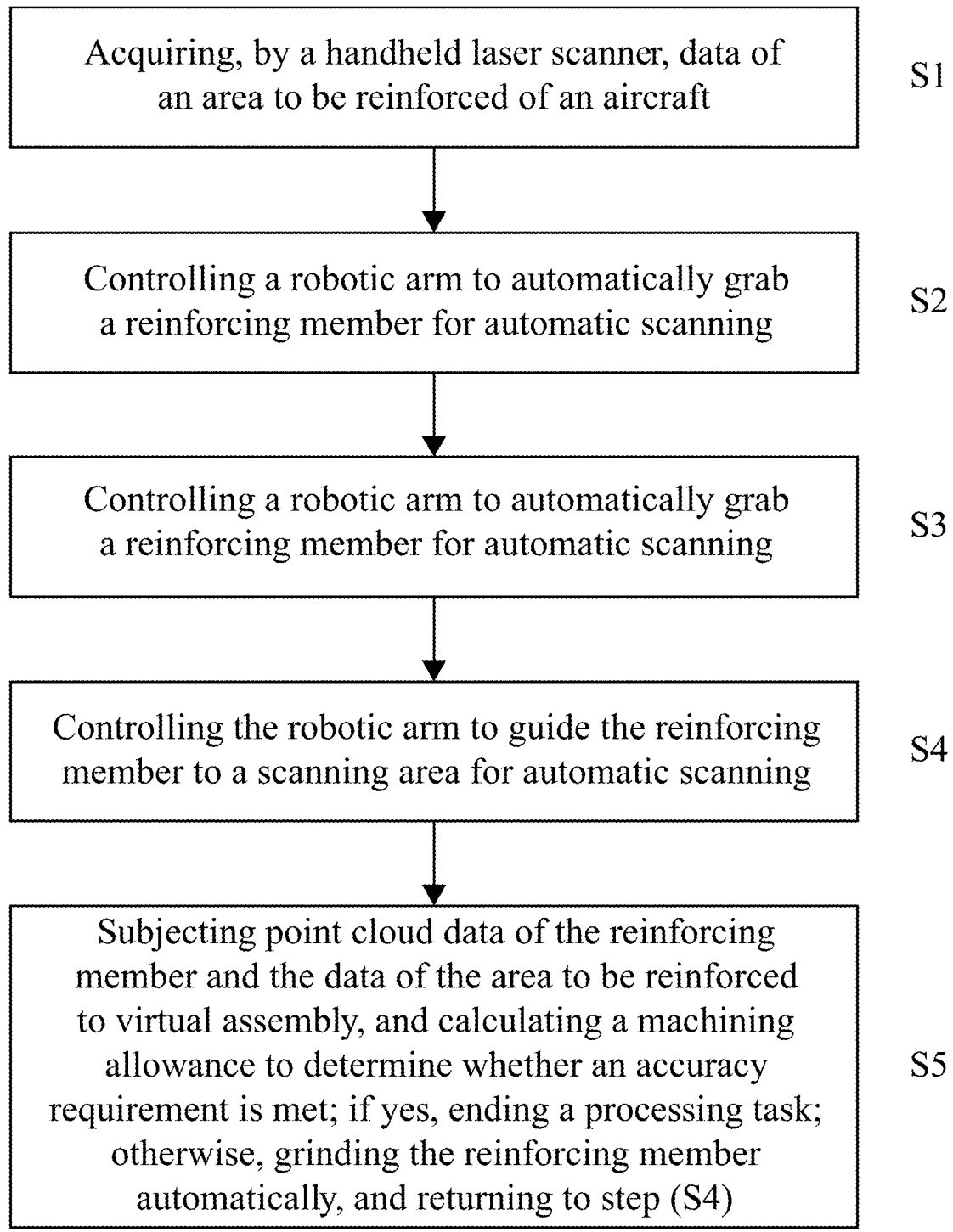
FIG. 1 is a flow chart of a method for automatically processing a structure-reinforcing member of an aircraft according to an embodiment of the present disclosure.

Illustrated in FIG. 1 is a method for automatically processing a structure-reinforcing member of an aircraft, which is performed through the following steps.

(S1) Data of an area to be reinforced of the aircraft is acquired by a handheld laser scanner, which is performed as follows.

(S101) Point cloud data of an inner surface of an area to be reinforced of the aircraft is acquired by the handheld laser scanner.

(S102) The point cloud data of the inner surface of the area to be reinforced is subjected to preprocessing and clipping to match a shape of a point cloud of the area to be reinforced with a shape of the structure-reinforcing member.

(S2) A robotic arm is controlled to automatically grab the reinforcing member for automatic scanning to obtain point cloud data of an outer surface of the structure-reinforcing member, which comprises the following steps.

(S201) The structure-reinforcing member is selected according to size, shape and damage characteristic of the area to be reinforced.

(S202) A reference surface of the structure-reinforcing member is determined according to a relative position relationship between the structure-reinforcing member and the area to be reinforced. The reference surface of the structure-reinforcing member is automatically gripped by the robotic arm.

Figure 2:
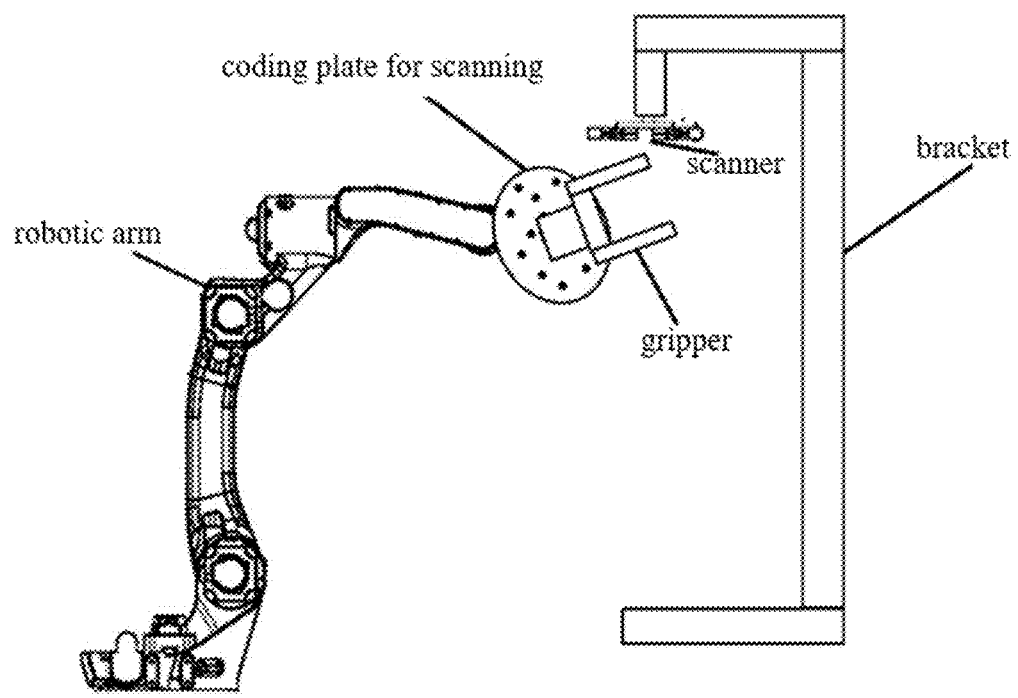
FIG. 2 schematically shows a connection between a robotic arm and a target according to an embodiment of the present disclosure.

In an embodiment, in step (S202), in terms of hardware layout, the three-dimensional (3D) laser scanner is fixed at a preset position. The robotic arm is fixed near the 3D laser scanner. The target is arranged behind a gripper of the robotic arm. As shown in FIG. 2, the target is configured for automatic splicing of multi-view data of the structure-reinforcing member. During the automatic splicing, a relative position between the target and the gripper of the robotic arm remains unchanged.

(S203) The robotic arm is controlled to move the structure-reinforcing member to a center of a scanning area of the 3D laser scanner for automatic scanning of the outer surface of the structure-reinforcing member according to a preset general scanning trajectory to obtain scanning data. The scanning data is subjected to automatic splicing according to a target arranged on the robotic arm to obtain the point cloud data of the outer surface of the structure-reinforcing member. The target is provided with a plurality of marking points.

(S3) A theoretical cutting path is set in a computer aided design (CAD) digital model of the structure-reinforcing member. The theoretical cutting path is subjected to registration with the point cloud data of the outer surface of the structure-reinforcing member to obtain an actual cutting path. The structure-reinforcing member is cut according to the actual cutting path. The step (S3) is performed through the following steps.

(S301) The CAD digital model corresponding to the structure-reinforcing member is found from a CAD digital model library.

(S302) The theoretical cutting path is marked in the CAD digital model.

(S303) Iterative closest point (ICP) registration is performed on the CAD digital model according to the point cloud data of the outer surface of the structure-reinforcing member to obtain the actual cutting path.

Coordinates of the CAD digital model and the actual cutting path are unified to a coordinate system.

(S304) The robotic arm is controlled to grip the structure-reinforcing member to move to a cutting area. The structure-reinforcing member is performed automatic cutting according to the coordinates of the actual cutting path.

(S4) The robotic arm is controlled to guide a cut structure-reinforcing member to a scanning area for automatic scanning to obtain point cloud data of an outer surface of the cut structure-reinforcing member, which is performed through the following steps.

The cut structure-reinforcing member is moved to a center of a scanning area of a 3D laser scanner for automatic scanning of the outer surface of the cut structure-reinforcing member according to a preset general scanning trajectory to obtain scanning data.

The scanning data is subjected to automatic splicing according to a target arranged on the robotic arm to obtain the point cloud data on the outer surface of the cut structure-reinforcing member. The target is provided with a plurality of marking points.

(S5) The point cloud data of the outer surface of the cut structure-reinforcing member and the data of the area to be reinforced are subjected to virtual assembly. A machining allowance is calculated to determine whether an accuracy requirement is met. If yes, a processing task is ended. Otherwise, the cut structure-reinforcing member is ground automatically, and steps (S4)-(S5) are repeated until the accuracy requirement is met. The step (S5) is performed through the following steps.

(S501) The cut structure-reinforcing member and the area to be reinforced are subjected to segmentation by using a random sample consensus (RANSAC) algorithm to obtain all core planes of point cloud of the cut structure-reinforcing member and the point cloud of the area to be reinforced. Normal vector, area and gravity center of each of the core planes are calculated.

(S502) The core planes of structure-reinforcing member are roughly registered to the core planes of the area to be reinforced according to a corresponding relationship of normal vectors, areas and gravity centers.

Figure 3:
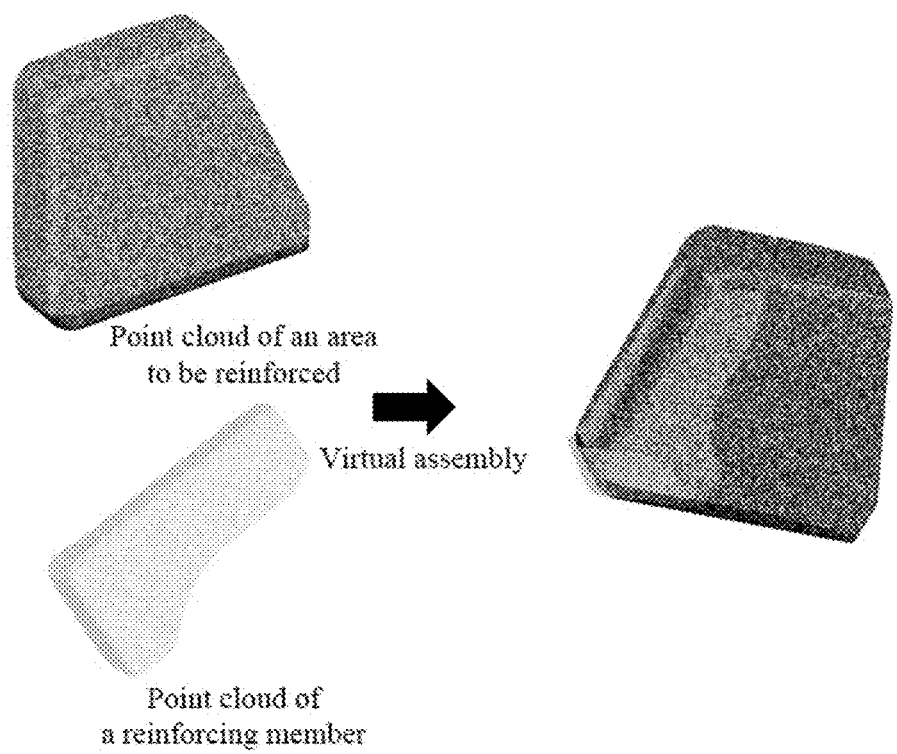
FIG. 3 shows visualization of virtual assembly of the reinforcing member and an area to be reinforced according to an embodiment of the present disclosure.

(S503) Based on the rough registration, virtual assembly is performed by using the ICP registration based on an allowance uniformity constraint through the following steps, which is shown in FIG. 3.

Suppose that the point cloud data of the cut structure-reinforcing member is $P=\{p_1, p_2, \ldots, p_N\}$; the point cloud data of the area to be reinforced is $Q=\{q_1, q_2, \ldots, q_M\}$; $q_i'$ is a nearest neighbor point of a point $P_i$ in Q; and $d_i=p_i-q_i'$, where a minimization distance constraint of the ICP registration is expressed as:

$$F_d = \sum_{i=1}^{N} \|d_i\|_2^2. \tag{1}$$

The allowance uniformity constraint is expressed as:

$$F_{du} = \sum_{i=1}^{N}\left(\|d_i\|_2 - \sum_{i=1}^{N}\|d_i\|_2/N\right)^2. \quad (2)$$

A final optimization constraint is expressed as:

$$\min_{R,t} F = F_d + \partial \cdot F_{dt}. \quad (3)$$

∂ represents an adjustable weight; N represents the total number of point clouds of the cut structure-reinforcing member; and M represents the total number of point clouds of the area to be reinforced.

(S504) The point clouds on the inner surface of the area to be reinforced and the point clouds on the outer surface of the cut structure-reinforcing member after the virtual assembly are performed allowance point searching.

A searching strategy is performed as follows.

An average distance $Dst_i$ of k nearest neighbor points of each point of the cut structure-reinforcing member in the area to be reinforced is calculated as:

$$Dst_i = \sum_{j=1}^{k}\|p_i - q'_j\|_2/k; \quad (4)$$

where k represents a parameter that is adjustable according to data point cloud density, with a default value of 20; if the average distance is greater than a preset threshold T, a corresponding point of the cut structure-reinforcing member is retained; otherwise, the corresponding point of the cut structure-reinforcing member is deleted; and all points of the cut structure-reinforcing member are traversed. Retained points are allowance points of the cut structure-reinforcing member.

k nearest neighbor points of the allowance points of the cut structure-reinforcing member in the area to be reinforced are searched. All searched points in the area to be reinforced are retained and points that are not in a neighborhood of the allowance points are deleted to obtain machining reference points of the allowance points.

Figure 4:
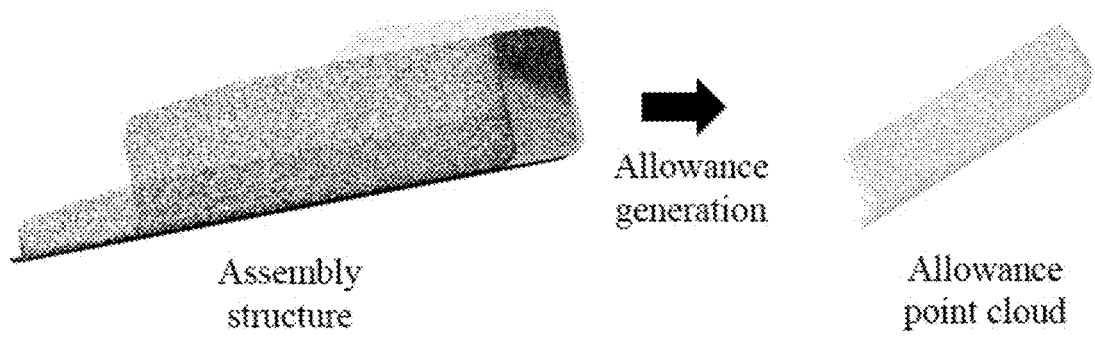
FIG. 4 shows visualization of allowance point cloud according to an embodiment of the present disclosure.
Figure 5:
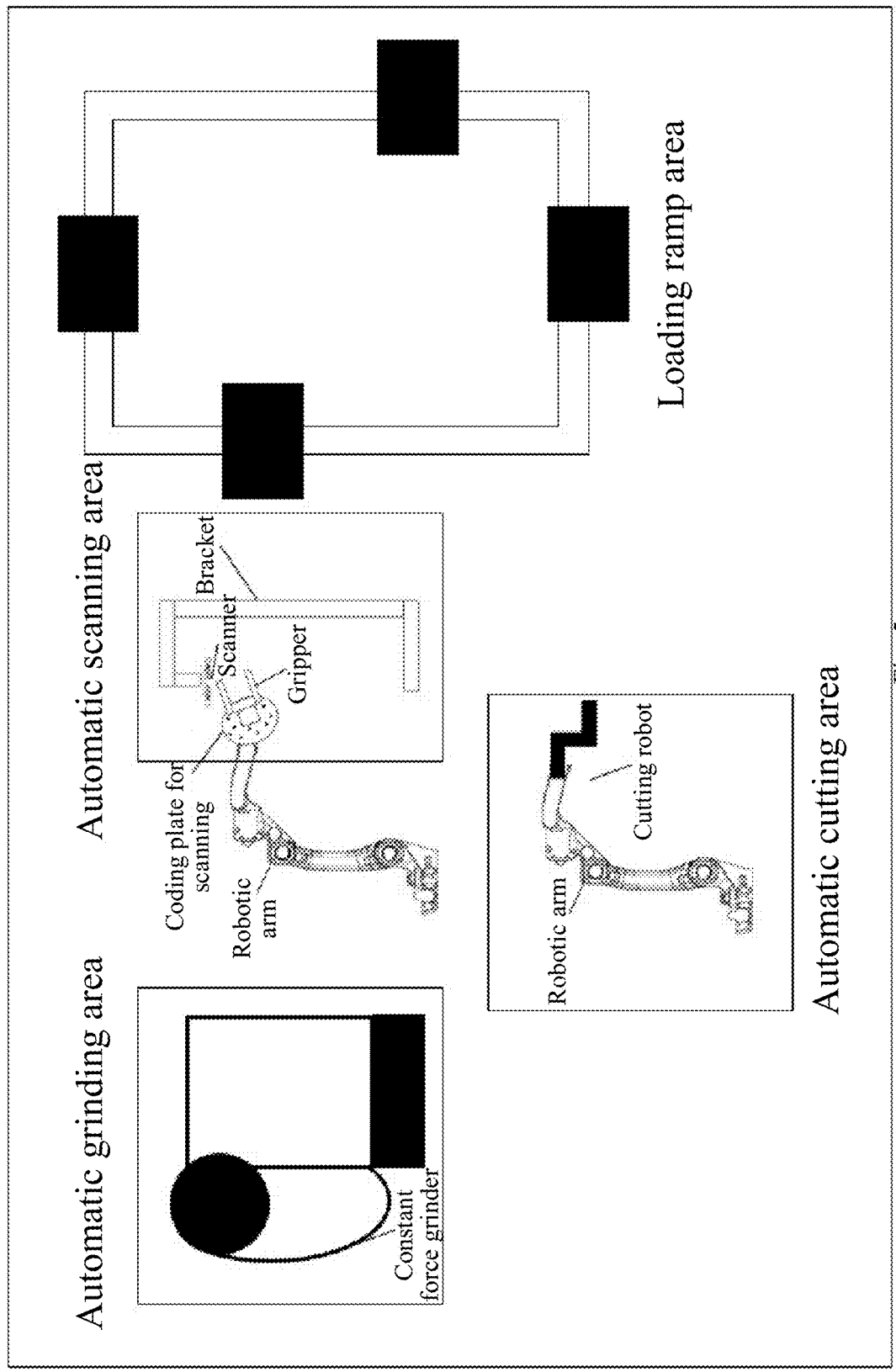
FIG. 5 schematically shows layout of a system for automatically processing the structure-reinforcing member according to an embodiment of the present disclosure.

The machining reference points and the allowance points are merged to obtain final allowance points. As shown in FIG. 4, as long as a grinding path is planned according to the final allowance points, a real allowance can be removed.

(S505) Whether the machining allowance meets the accuracy requirement is determined.

If yes, the processing task is ended.

Otherwise, step (S506) is performed.

(S506) The grinding path is planned according to the final allowance points. The robotic arm is controlled to grip the cut structure-reinforcing member for automatic grinding.

(S507) Steps (S4)-(S5) are repeated.

This application provides a method for automatically processing a structure-reinforcing member of an aircraft, which is performed through acquiring a three-dimensional point cloud data of the structure-reinforcing member and the area to be reinforced, cutting along a cutting line marked on a computer aided design (CAD) digital model of the structure-reinforcing member, and subjecting point clouds of the reinforcing member and an area to be reinforced to virtual assembly to generate an allowance point cloud and planning a grinding path to reach the automatic processing of the structure-reinforcing member. This application can effectively solve the problems of low automation and manual repair of the structure-reinforcing member, so as to process the structure-reinforcing member automatically and greatly improve the repair efficiency and quality of the structure-reinforcing member of the aircraft.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A method for automatically processing a structure-reinforcing member of an aircraft, comprising:
(S1) acquiring, by a handheld laser scanner, data of an area to be reinforced of the aircraft;
(S2) controlling a robotic arm to automatically grab the structure-reinforcing member for automatic scanning to obtain point cloud data of an outer surface of the structure-reinforcing member;
(S3) setting a theoretical cutting path in a computer aided design (CAD) digital model of the structure-reinforcing member;
subjecting the theoretical cutting path to registration with the point cloud data of the outer surface of the structure-reinforcing member to obtain an actual cutting path; and
cutting the structure-reinforcing member according to the actual cutting path;
(S4) controlling the robotic arm to guide a cut structure-reinforcing member to a scanning area for automatic scanning to obtain point cloud data of an outer surface of the cut structure-reinforcing member; and
(S5) subjecting the point cloud data of the outer surface of the cut structure-reinforcing member and the data of the area to be reinforced to virtual assembly and calculating a machining allowance to determine whether an accuracy requirement is met;
if yes, ending a processing task;
otherwise, grinding the cut structure-reinforcing member automatically, and repeating steps (S4)-(S5) until the accuracy requirement is met;
wherein the step (S5) is performed through steps of:
(S501) subjecting the cut structure-reinforcing member and the area to be reinforced to plane segmentation by using a random sample consensus (RANSAC) algorithm to obtain all core planes of point cloud of the cut structure-reinforcing member and point cloud of the area to be reinforced; and
calculating a normal vector, area and gravity center of each of the core planes;
(S502) roughly registering the core planes of structure-reinforcing member to the core planes of the area to be reinforced according to a corresponding relationship of normal vectors, areas and gravity centers;
(S503) based on the rough registration, performing virtual assembly by using an ICP registration based on an allowance uniformity constraint through steps of:
supposing that the point cloud data of the cut structure-reinforcing member is P={$p_1, p_2, \ldots, p_N$}; the point cloud data of the area to be reinforced is Q={$q_1, q_2, \ldots, q_M$}; $q_i'$ is a nearest neighbor point of point $P_i$ within Q; and $d_i=p_i-q_i'$, wherein a minimization distance constraint of the ICP registration is expressed as:

$$F_d = \sum_{i=1}^{N} \|d_i\|_2^2; \quad (1)$$

the allowance uniformity constraint of the ICP registration is expressed as:

$$F_{du} = \sum_{i=1}^{N}\left(\|d_i\|_2 - \sum_{i=1}^{N}\|d_i\|_2/N\right)^2; \quad (2)$$

and
a final optimization constraint is expressed as:

$$\min_{R,t} F = F_d + \partial \cdot F_{dt}; \quad (3)$$

wherein $\partial$ represents an adjustable weight; N represents the total number of point clouds of the cut structure-reinforcing member; and M represents the total number of point clouds of the area to be reinforced;

(S504) performing allowance point searching on the point clouds on the inner surface of the area to be reinforced and the point clouds on the outer surface of the cut structure-reinforcing member after the virtual assembly;

wherein a searching strategy is performed as follows:
calculating an average distance $Dst_i$ of k nearest neighbor points of each point of the cut structure-reinforcing member in the area to be reinforced, expressed as follows:

$$Dst_i = \sum_{j=1}^{k}\|p_i - q_j'\|_2/k; \quad (4)$$

wherein if the average distance is greater than a preset threshold T, a corresponding point of the cut structure-reinforcing member is retained; otherwise, the corresponding point of the cut structure-reinforcing member is deleted; and traversing all points of the cut structure-reinforcing member, wherein retained points are allowance points of the cut structure-reinforcing member;

searching k nearest neighbor points of the allowance points of the cut structure-reinforcing member in the area to be reinforced; and retaining all searched points in the area to be reinforced and deleting points that are not in a neighborhood of the allowance points to obtain machining reference points of the allowance points; and merging the machining reference points and the allowance points to obtain final allowance points;

(S505) determining whether the machining allowance meets the accuracy requirement;
if yes, ending the processing task;
otherwise, proceeding to step (S506);

(S506) planning a grinding path according to the final allowance points; and controlling the robotic arm to grip the cut structure-reinforcing member for automatic grinding; and (S507) returning to step (S4) for automatic scanning.

2. The method of claim 1, wherein the step (S1) is performed through steps of:
(S101) acquiring, by the handheld laser scanner, point cloud data of an inner surface of the area to be reinforced of the aircraft; and
(S102) subjecting the point cloud data of the inner surface of the area to be reinforced to preprocessing and clipping to match a shape of a point cloud of the area to be reinforced with a shape of the structure-reinforcing member.

3. The method of claim 2, wherein in step (S102), the preprocessing comprises:
performing down-sampling and denoising processing on the point cloud data of the inner surface of the area to be reinforced.

4. The method of claim 1, wherein the step (S2) is performed through steps of:
(S201) selecting the structure-reinforcing member according to size, shape and damage characteristic of the area to be reinforced;
(S202) determining a reference surface of the structure-reinforcing member according to a relative position relationship between the structure-reinforcing member and the area to be reinforced; and
automatically gripping, by the robotic arm, the reference surface of the structure-reinforcing member;
(S203) controlling the robotic arm to move the structure-reinforcing member to a center of a scanning area of a three-dimensional (3D) laser scanner for automatic scanning of the outer surface of the structure-reinforcing member according to a preset general scanning trajectory to obtain scanning data, and subjecting the scanning data to automatic splicing according to a target arranged on the robotic arm to obtain the point cloud data of the outer surface of the structure-reinforcing member, wherein the target is provided with a plurality of marking points.

5. The method of claim 4, wherein in step (S202), the 3D laser scanner is fixed at a preset position; the robotic arm is fixed near the 3D laser scanner; the target is arranged behind a gripper of the robotic arm, and is configured for automatic splicing of multi-view data of the structure-reinforcing member; and during the automatic splicing, a relative position between the target and the gripper of the robotic arm remains unchanged.

6. The method of claim 1, wherein the step (S3) is performed through steps of:
(S301) finding the CAD digital model corresponding to the structure-reinforcing member from a CAD digital model library;
(S302) marking the theoretical cutting path in the CAD digital model;
(S303) performing iterative closest point (ICP) registration on the CAD digital model according to the point cloud data of the outer surface of the structure-reinforcing member to obtain the actual cutting path; and
unifying coordinates of the CAD digital model and the actual cutting path to a coordinate system; and
(S304) controlling the robotic arm to grip the structure-reinforcing member to move to a cutting area; and
performing automatic cutting according to the coordinates of the actual cutting path.

7. The method of claim 1, wherein the step (S4) is performed through steps of:
moving the cut structure-reinforcing member to a center of a scanning area of a 3D laser scanner for automatic scanning of the outer surface of the cut structure-reinforcing member according to a preset general scanning trajectory to obtain scanning data; and subjecting the scanning data to automatic splicing according to a target arranged on the robotic arm to obtain the point cloud data on the outer surface of the cut structure-reinforcing member, wherein the target is provided with a plurality of marking points.

\* \* \* \* \*